(12) United States Patent
Kuramoto et al.

(10) Patent No.: US 10,738,743 B2
(45) Date of Patent: Aug. 11, 2020

(54) WORK VEHICLE

(71) Applicant: Kubota Corporation, Osaka-shi (JP)

(72) Inventors: Takashi Kuramoto, Sakai (JP); Junichi Fujiwara, Sakai (JP)

(73) Assignee: Kubota Corporation, Osaka (JP)

(*) Notice: Subject to any disclaimer, the term of this patent is extended or adjusted under 35 U.S.C. 154(b) by 47 days.

(21) Appl. No.: 16/010,579

(22) Filed: Jun. 18, 2018

(65) Prior Publication Data

US 2019/0145356 A1  May 16, 2019

(30) Foreign Application Priority Data

Nov. 15, 2017 (JP) ................. 2017-219919

(51) Int. Cl.
| | | |
|---|---|---|
| *F02M 25/08* | (2006.01) | |
| *B60K 15/03* | (2006.01) | |
| *B60K 15/035* | (2006.01) | |
| *B60K 15/063* | (2006.01) | |

(52) U.S. Cl.
CPC ........ *F02M 25/0836* (2013.01); *B60K 15/03* (2013.01); *B60K 15/03504* (2013.01); *B60K 15/03519* (2013.01); *F02M 25/089* (2013.01); *B60K 2015/03514* (2013.01); *B60K 2015/03523* (2013.01); *B60K 2015/03542* (2013.01); *B60K 2015/0636* (2013.01); *B60Y 2200/20* (2013.01)

(58) Field of Classification Search
CPC ................................................. F02M 25/0836
See application file for complete search history.

(56) References Cited

U.S. PATENT DOCUMENTS

| | | | | |
|---|---|---|---|---|
| 4,926,914 A | * | 5/1990 | Morizumi | ........ B60K 15/03519 123/519 |
| 7,287,619 B2 | * | 10/2007 | Tanaka | .................. B60K 13/02 180/291 |
| 7,367,417 B2 | * | 5/2008 | Inui | ......................... B62D 3/12 180/69.1 |
| 7,677,343 B2 | * | 3/2010 | Kitai | ....................... B60K 5/12 180/291 |
| 2009/0239706 A1 | * | 9/2009 | Ishida | ................. F16H 61/4017 477/40 |
| 2016/0273495 A1 | * | 9/2016 | Yamamoto | ......... F02M 25/0854 |
| 2017/0282706 A1 | * | 10/2017 | Miyabe | .................. F02M 25/08 |

FOREIGN PATENT DOCUMENTS

JP  200967144 A  4/2009

* cited by examiner

*Primary Examiner* — Phutthiwat Wongwian
*Assistant Examiner* — Arnold Castro
(74) *Attorney, Agent, or Firm* — The Webb Law Firm

(57) ABSTRACT

A fuel tank, an engine to which fuel is supplied from the fuel tank through a suction path, a canister for absorbing fuel vapor from the fuel tank, a guide pipe for supplying fuel vapor to the suction path, and a control valve for controlling a flowing state of fuel vapor in the guide pipe are provided. The canister and the control valve are integrally attached to the support member, and the support member is supported by a vehicle body fixing portion.

3 Claims, 8 Drawing Sheets

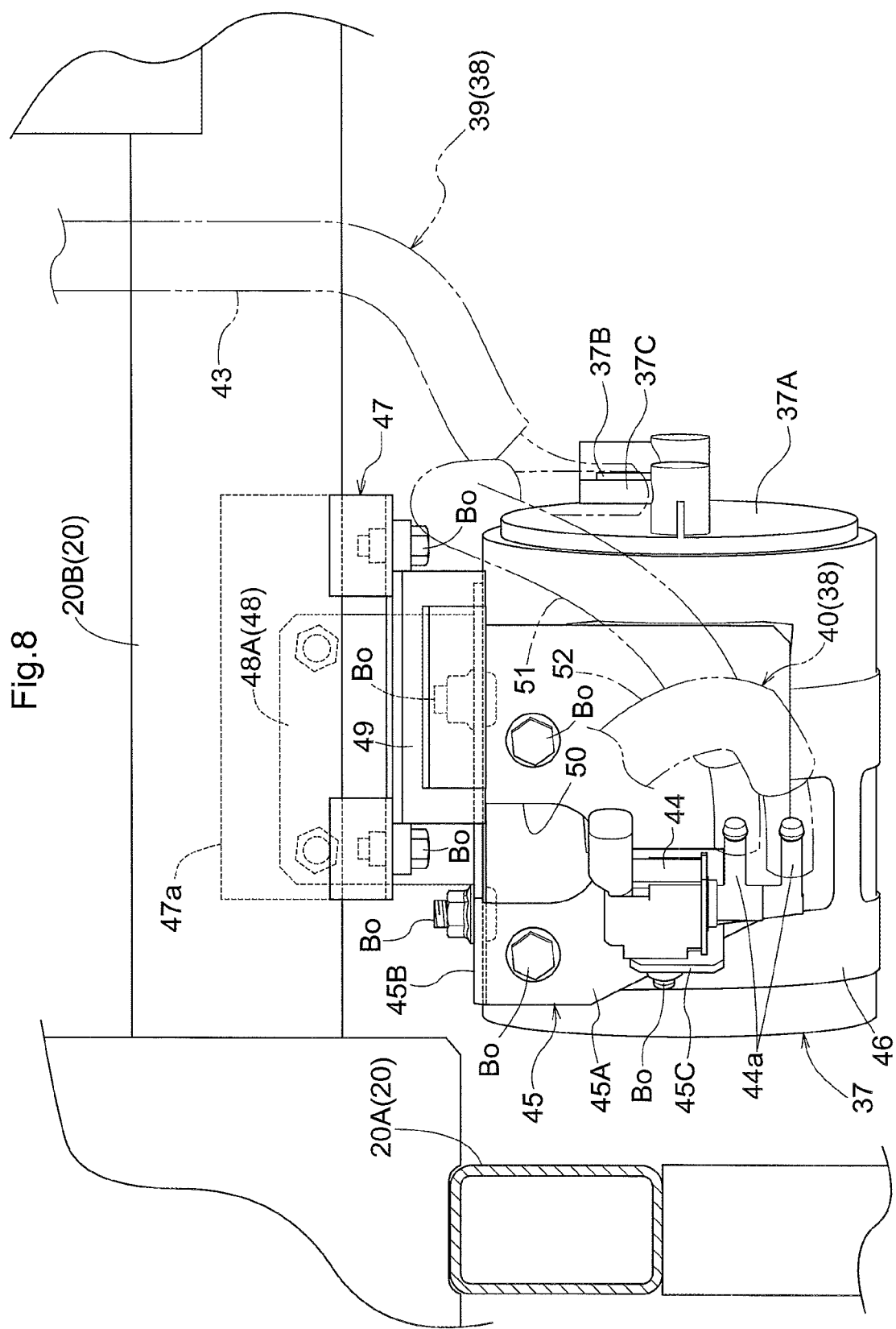

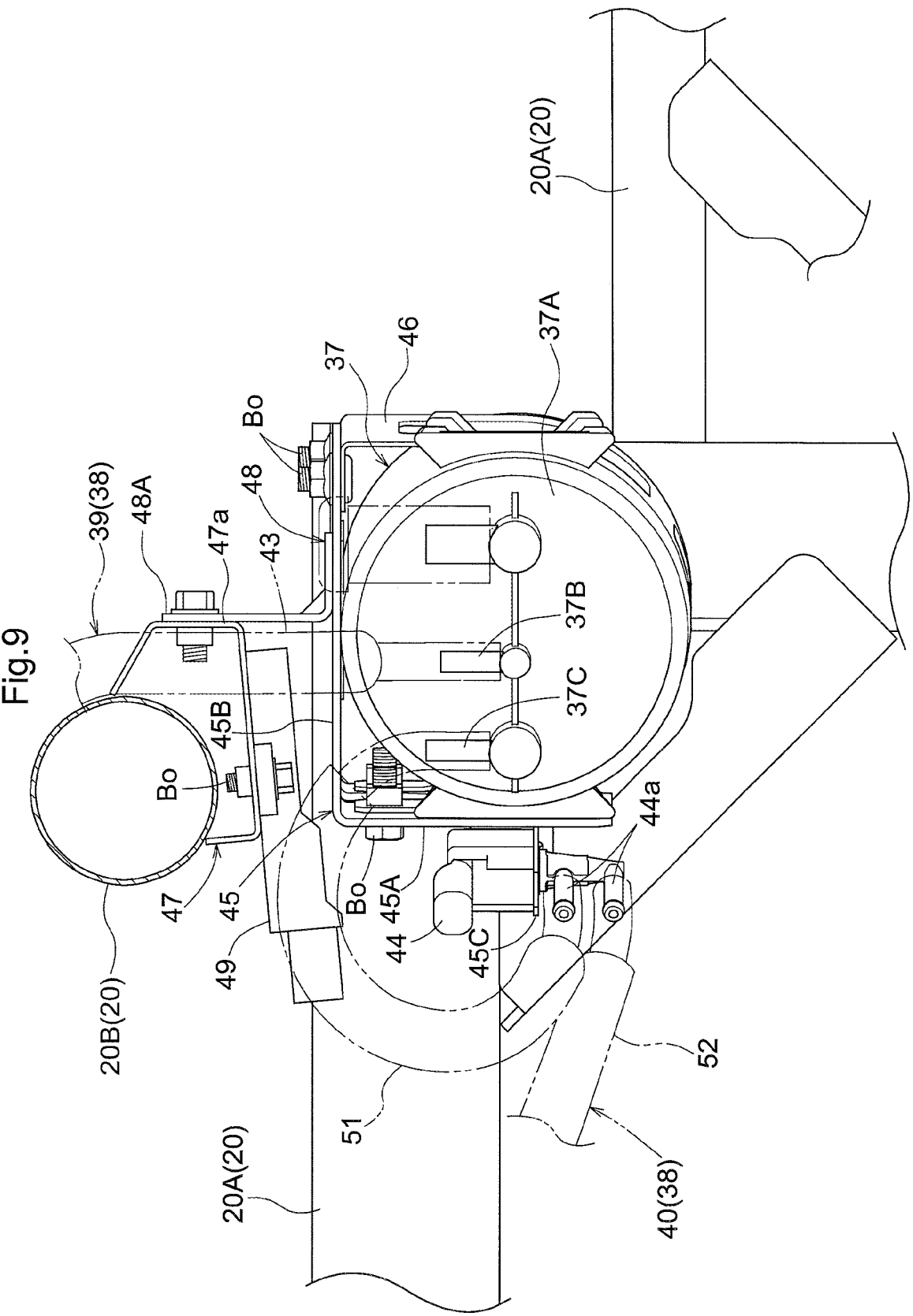

WORK VEHICLE

CROSS-REFERENCE TO RELATED APPLICATION

This application claims priority to Japanese Patent Application No. 2017-219919 filed Nov. 15, 2017, the disclosure of which is hereby incorporated in its entirety by reference.

BACKGROUND OF THE INVENTION

1. Field of the Invention

The present invention relates to a work vehicle that includes a canister for suctioning fuel vapor from a fuel tank.

2. Description of the Related Art

This kind of work vehicle is provided with a canister to prevent evaporated fuel from being discharged to the outside from a fuel tank. In such a work vehicle, conventionally, the canister is attached via a support member that is integrally connected to an upper face of the fuel tank, and a guide pipe for supplying fuel vapor to a suction path, a control valve for opening and closing a path of the guide pipe, and so on, are separately fitted to the canister (e.g. see JP 2009-67144A).

In the case of the above-described conventional configuration, when operations to assemble a work vehicle are performed, members such as the aforementioned canister, guide pipe, and control valve need to be separately fitted to a vehicle body, which has a large-scale shape in which, for example, an engine and other devices accompanying the engine are fitted, in advance, onto a vehicle body frame. This makes fitting operations burdensome.

There has been a demand for simplification of operations to fit members around a canister in a work vehicle that includes a canister.

SUMMARY OF THE INVENTION

A characteristic configuration of a work vehicle according to the present invention lies in (c1)

According to the present invention, a configuration is employed in which the canister and the control valve are integrally attached to the support member, and the support member is supported by the vehicle body fixing portion. For this reason, when fitted to a vehicle body, the canister and the control valve can be integrally fitted, in advance, to the support member to make a unit, and this unit assembly can be attached, as-is, to the vehicle body fixing portion. At this time, the guide pipe, which is to be connected to the canister, can also be fitted thereto in advance, and an operation to attach the support member to the vehicle body fixing portion with the aforementioned members integrally attached thereto need only be performed.

Accordingly, the operation to fit the members around the canister can be simplified compared with the case of separately fitting the canister, control valve, support member, guide pipe, and so on, and the efficiency of the fitting operation can be improved.

In the present invention, it is preferable that (c2)

With this configuration, fuel vapor is supplied toward the downstream side in the suctioned air flowing direction of the throttle valve. During a low-load operation of the engine, the opening of the throttle valve decreases and introduction of excess fuel vapor to the engine can be suppressed. On the other hand, a large amount of fuel is required for a high-load operation. Meanwhile, the opening of the throttle valve increases, and a large amount of fuel vapor is introduced to the engine. As a result, a large amount of fuel vapor can be consumed.

In this invention, it is favorable that (c3)

With this configuration, if the vehicle body is inclined in the front-rear direction or the left-right direction, the fuel tank is also inclined in the front-rear direction or the left-right direction. However, regardless of which direction the fuel tank is inclined, evaporated fuel in the tank can be discharged through either pipe line of the forked pipe line portion. That is to say, even if the fuel tank is inclined, the liquid surface of the fuel stored in the tank stays horizontal. Accordingly, either one of the two inlet portions of the forked pipe line portion enters a state of facing an open space above the liquid surface, and thus, fuel vapor can be guided.

The merging-side pipe line portion, which is to be connected to the canister, is provided so as to be able to be connected to and separated from the merging portion of the forked pipe line portion, which is to be connected to the fuel tank. Accordingly, during fitting operations, the merging-side pipe line portion, in addition to the canister, the control valve, and the support member, can be integrally fitted, in advance, to each other to make a unit, and thus, the efficiency of the fitting operation can be further improved.

BRIEF DESCRIPTION OF THE DRAWINGS

FIG. 8 is a back view illustrating the canister support structure.
FIG. 9 is a side view illustrating the canister support structure.

DETAILED DESCRIPTION OF PREFERRED EMBODIMENTS

Figure 1:
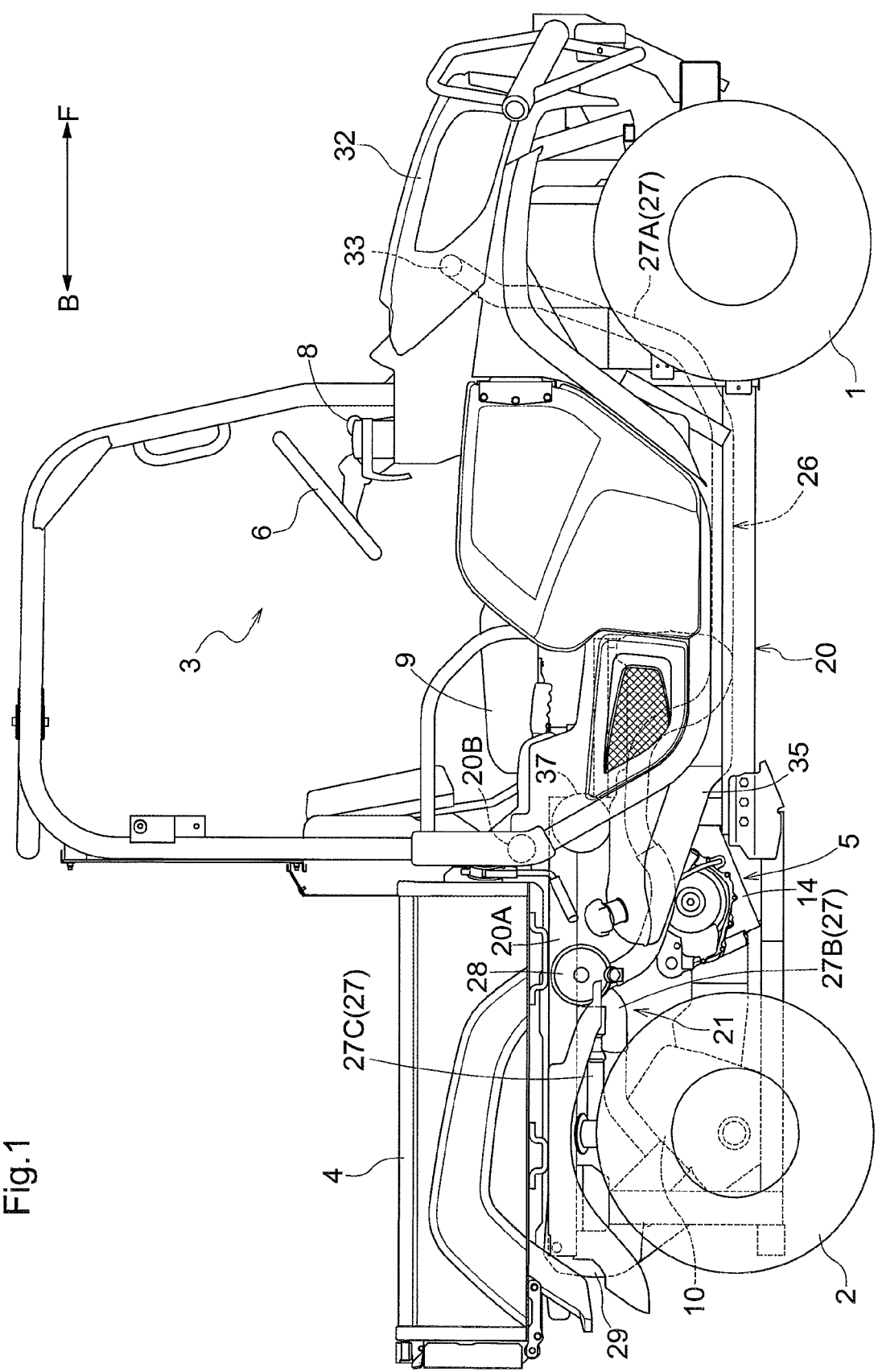
FIG. 1 is an overall side view of a work vehicle.

Hereinafter, an exemplary embodiment of a work vehicle according to the present invention will be described based on the illustrations in the drawings. Note that the front-rear direction and the left-right direction in the description of this embodiment are as follows, unless otherwise stated. That is to say, "front" refers to the direction indicated by the arrow F in FIG. 1, "rear" refers to the direction indicated by the arrow B in FIG. 1, "right" refers to the direction indicated by the arrow R in FIG. 4, and "left" refers to the direction indicated by the arrow L in FIG. 4.

Overall Configuration

FIG. 1 shows a multipurpose vehicle, which serves as an example of a work vehicle. This multipurpose vehicle is configured as a vehicle capable of being used for a variety of purposes, such as item transport and recreation. The work vehicle has a travelling vehicle body that includes a pair of left and right front wheels 1 that can be driven and steered, and a pair of left and right rear wheels 2 that can be driven. An operation unit 3 that an operator enters to operate the work vehicle is provided in a center portion of the traveling vehicle body, and a carrier 4 on which items can be placed and that can be subjected to a dumping operation is provided in a rear portion of the traveling vehicle body. A motor unit 5 is provided below the carrier 4.

The operation unit 3 is provided with a steering wheel 6 for steering the front wheels 1, a gear shift lever 8 for performing a gear shift operation, an operator seat 9 on which a passenger can sit, an accelerator pedal (not shown), and so on. The gear shift lever 8 can be switched, by being swung, between a first forward position, a second forward position, a neutral position, and a reverse position.

Figure 2:
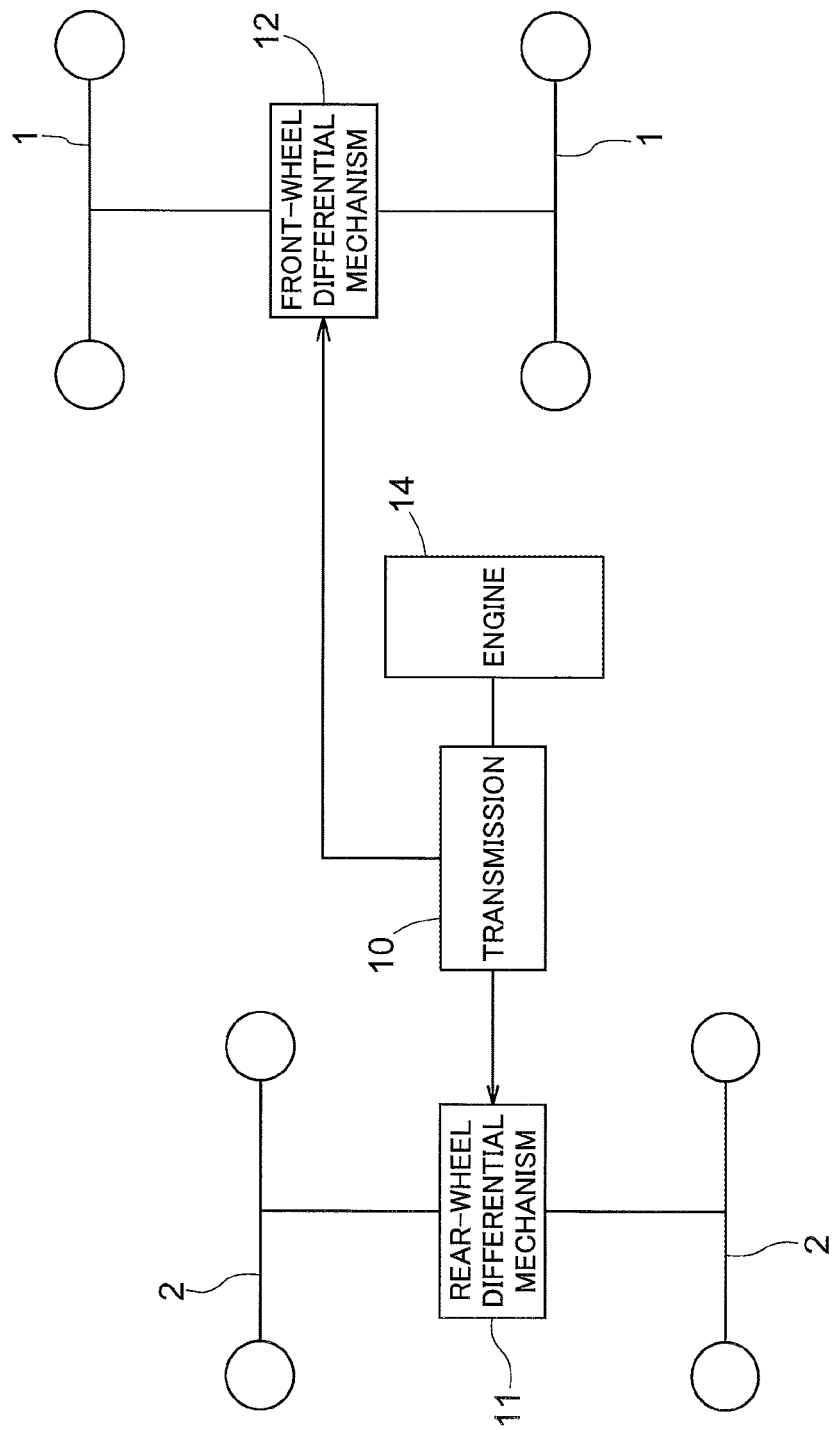
FIG. 2 illustrates a transmission system.

As shown in FIG. 2, a gasoline engine (hereinafter abbreviated to "engine") 14 and a transmission 10 for changing speed for the output from the engine 14 and transmitting the output to the front wheels 1 and the rear wheels 2 are provided. Although a specific configuration is not described in detail, the transmission 10 can be switched, by operating the gear shift lever 8, between a plurality of speed-change states with different gear ratios, namely a first forward state, a second forward state, a neutral state, and a reverse state. In the neutral state, transmission is interrupted, and the traveling vehicle body enters a travel-stop state. Power output from the transmission 10 is transmitted to the left and right rear wheels 2 via a rear-wheel differential mechanism 11, and is also transmitted to the left and right front wheels 1 via a front-wheel differential mechanism 12.

Figure 3:
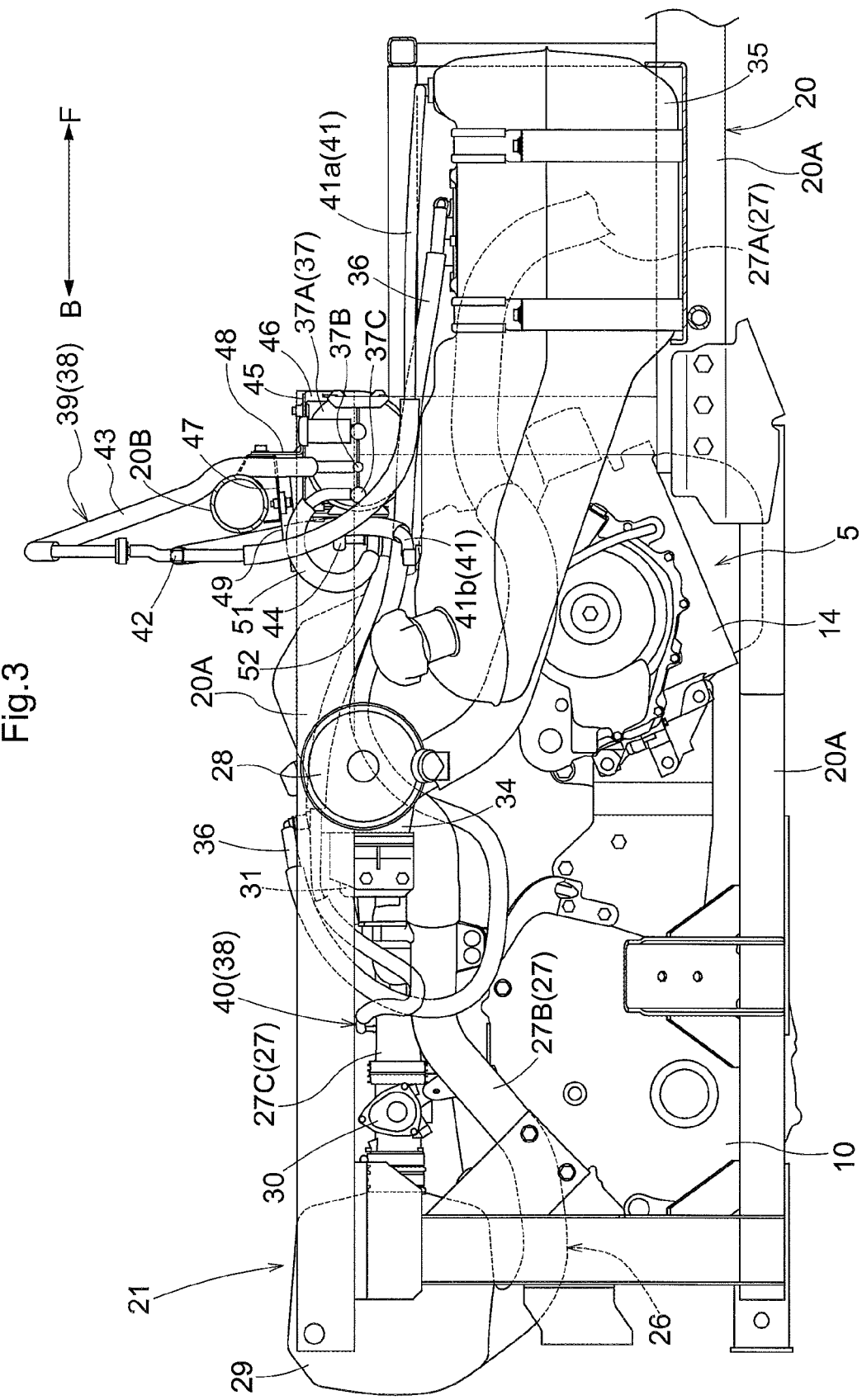
FIG. 3 is a side view of a motor unit.
Figure 4:
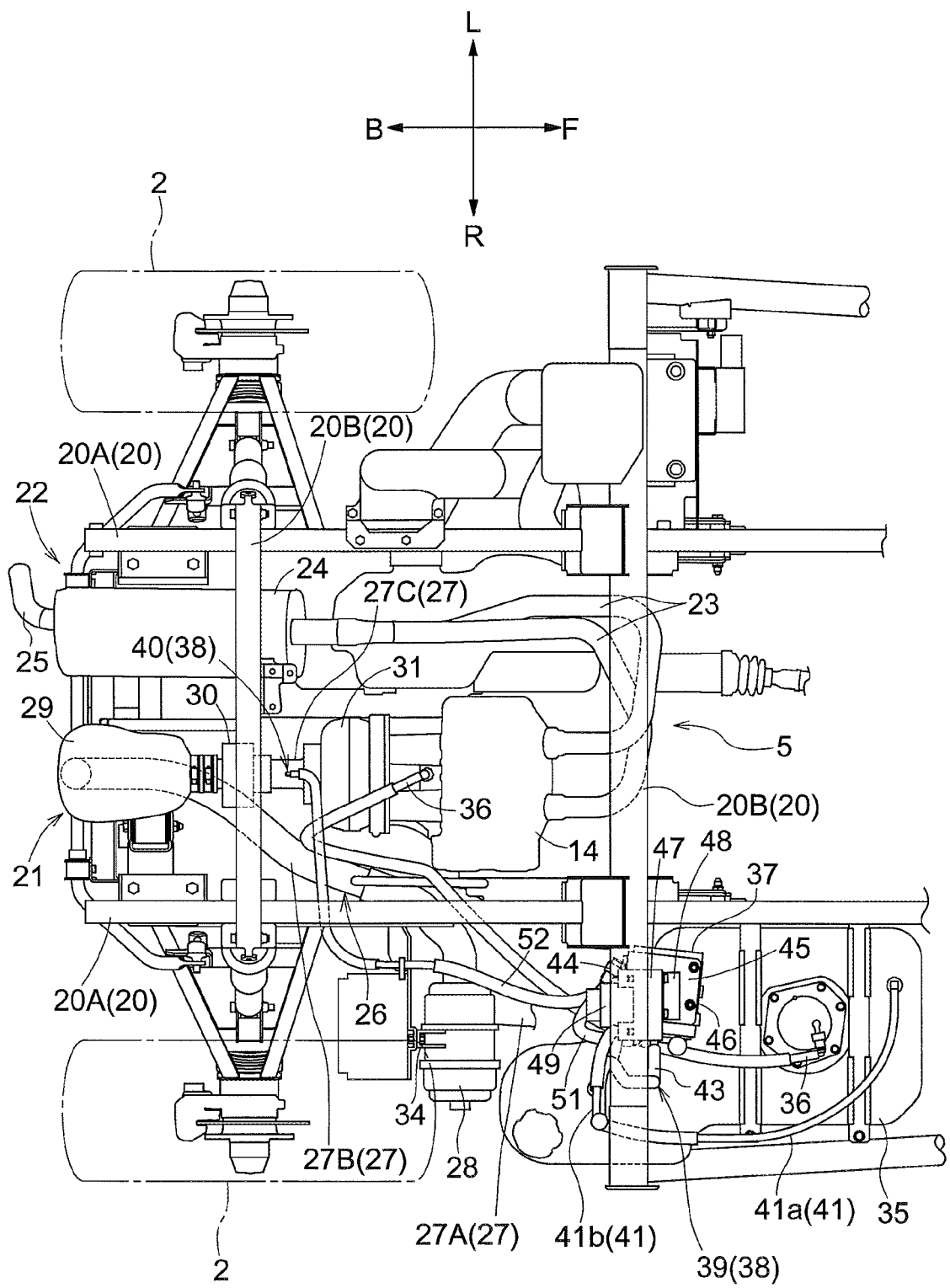
FIG. 4 is a plan view of the motor unit.

As shown in FIGS. 3 and 4, the engine 14, the transmission 10, and so on, are supported by the vehicle body frame 20. The vehicle body frame 20 is formed to have a frame shape constituted by a plurality of front-rear frame bodies 20A that extend in the front-rear direction, a plurality of lateral frame bodies 20B that extend in the lateral direction, and so on.

As shown in FIG. 4, the motor unit 5 is provided with a suction device 21 for introducing outside air to the engine 14, and an exhaust device 22 for discharging exhaust gas from the engine 14. The suction device 21 and the exhaust device 22 are arranged with one being the left side and the other on the right side.

As shown in FIG. 4, the exhaust device 22 is provided with exhaust pipes 23 through which exhaust gas discharged from the engine 14 flows, and a muffler 24 capable of reducing exhaust noise. The exhaust pipes 23 extend from the engine 14 toward the machine body front side, are then bent and circumvent a side of the engine 14, and extend toward the machine body rear side. The exhaust pipes 23 are arranged so as to pass over the transmission 10. Two exhaust pipes 23 extend from a front end portion of the engine 14, merge with each other at a front end portion of the muffler 24, and are then connected to the muffler 24. Exhaust gas with exhaust noise reduced by the muffler 24 is discharged outward from an exhaust port 25 in a vehicle body rear portion.

Suction Device

The suction device 21 will be described next. As shown in FIGS. 3 and 4, the suction device 21 includes a suction pipe 27 that constitutes a suction path 26 through which combustion air to be introduced to the engine 14 flows, an air cleaner 28 for removing dust from the air, a resonator 29 for muting suction noise, a throttle valve 30 for changing and adjusting the amount of combustion air supplied to the engine 14, a suction branching portion 31 for branching the suction path 26 to respective cylinders of the engine 14, and so on.

As shown in FIG. 1, the suction pipe 27 extends in an elongated manner in the front-rear direction from the vehicle body front side to a vehicle rear end portion. An end portion of the suction pipe 27 on the vehicle body front side is located in a space within a hood 32, and an outside air intake port 33 for taking in air from the outside is formed at this end portion. The suction pipe 27 extends rearward from the outside air intake port 33. As shown in FIGS. 1, 3, and 4, the suction pipe 27 includes a front suctioning portion 27A that passes through the space within the hood 32 and below the operation unit 3, and extends up to the air cleaner 28, an intermediate suctioning portion 27B that extends from the air cleaner 28 up to the resonator 29, which is located in the vehicle body rear end portion, and an engine-side suctioning portion 27C that extends from the resonator 29 up to the engine 14.

The air cleaner 28 is located on the upper right side of the engine 14 in the motor unit 5, and is arranged with the longitudinal direction of the air cleaner 28 parallel to the vehicle left-right direction. The air cleaner 28 is supported by a bracket 34. The bracket 34 is supported by the vehicle body frame 20.

The engine-side suctioning portion 27C of the suction pipe 27 is connected to an upper portion of the resonator 29. The throttle valve 30 is provided on the upstream side in the flowing direction of the engine-side suctioning portion 27C, and the suction branching portion 31 is provided on the downstream side in the flowing direction of the throttle valve 30. The engine-side suctioning portion 27C branches into two lines at the suction branching portion 31 to supply air to the respective cylinders of the engine 14. Thus, the suction path 26 supplies, to the engine 14, air that has passed through and been cleaned by the air cleaner 28 and subjected to adjustment of the suctioned air amount by the throttle valve 30.

Configuration of Fuel Supply System

As shown in FIGS. 1, 3, and 4, the fuel tank 35 is provided in a state of being located in a right portion of a space below the operator seat 9, and in a portion on the right side of the engine 14. The fuel tank 35 is formed so as to be wide in the front-rear direction and narrow in the lateral direction when seen in a plan view. The fuel in the fuel tank 35 is injected to the suction path 26 by a fuel injection device (injector; not shown) through a fuel supply path 36, and is supplied to combustion chambers in the cylinders of the engine 14.

canister 37, which contains an absorbent such as activated charcoal for absorbing fuel vapor from the fuel tank 35, is provided in a portion above the rear side of the fuel tank 35. As a result of being suctioned by the canister 37, the fuel vapor evaporated in the fuel tank 35 is prevented from leaking out from a pipe connecting portion, for example, and being discharged into the outside air.

As shown in FIG. 4, the fuel vapor from the fuel tank 35 is supplied through a guide pipe 38 to a portion on the downstream side in a suctioned air flowing direction relative to a portion of the suction path 26 at which the throttle valve 30 is installed. The canister 37 is provided at an intermediate portion of the path of the guide pipe 38, and the guide pipe 38 is constituted by an introducing-side guide pipe 39 that connects the fuel tank 35 to the canister 37, and a discharging-side guide pipe 40 that connects the canister 37 to the suction path 26.

Figure 5:
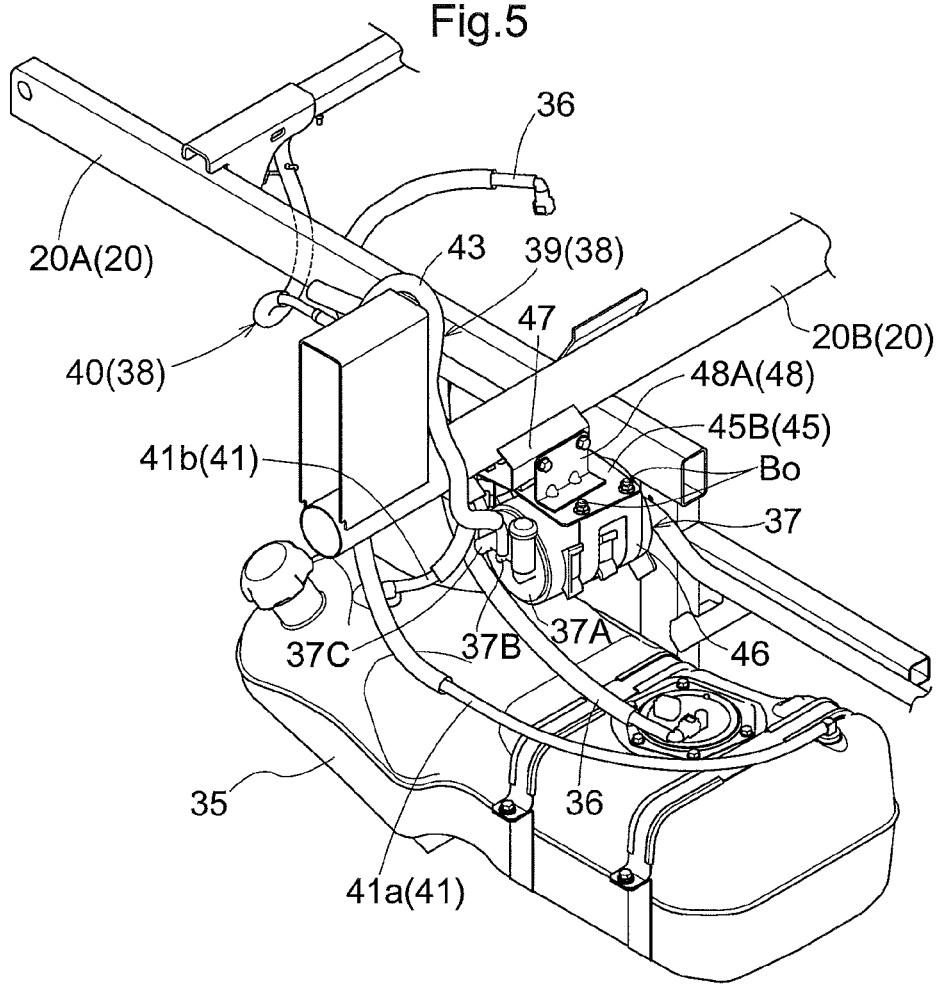
FIG. 5 is a perspective view of a canister installation unit.
Figure 6:
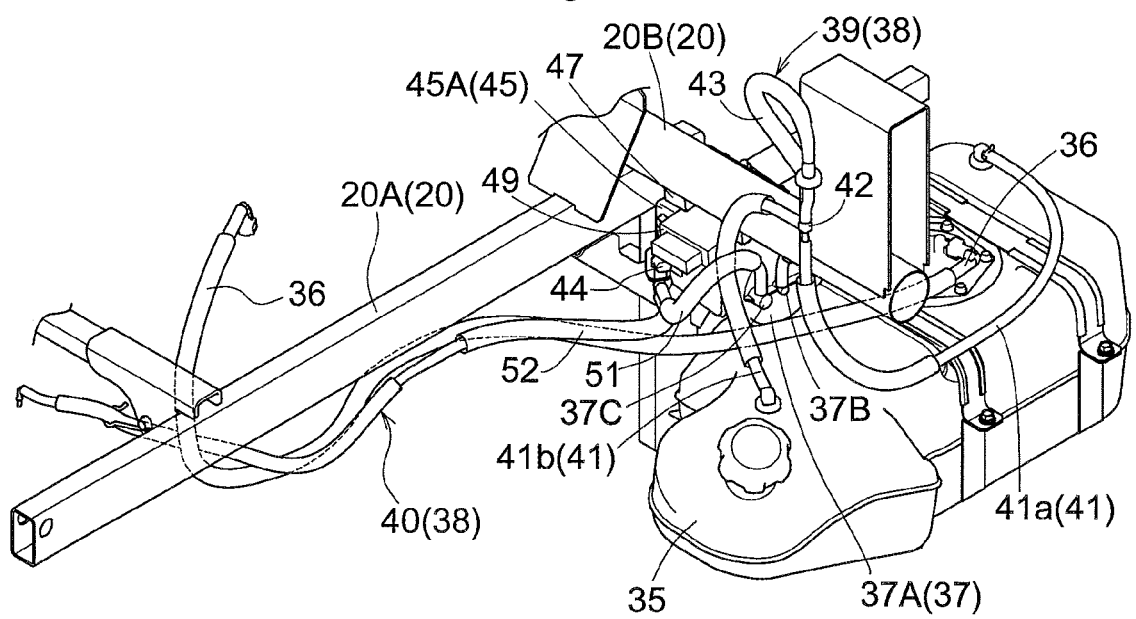
FIG. 6 is a perspective view of the canister installation unit.

As shown in FIGS. 4, 5, and 6, the introducing-side guide pipe 39 is provided with a forked pipe line portion 41 with two pipe lines that are connected, on one end side, to respective portions at different positions in the vehicle front-rear direction and in the vehicle left-right direction on the upper face of the fuel tank 35, and merge with and are connected to each other on the other end side, and a merging-side pipe line portion 43 that connects a merging portion 42 of the forked pipe line portion 41 to the canister 37. Fuel vapor is supplied to the canister 37 through the forked pipe line portion 41 and the merging-side pipe line portion 43.

The forked pipe line portion 41 will now be described further. As shown in FIG. 6, one pipe line 41a of the forked pipe line portion 41 is connected, on one end side, to a front left portion of the fuel tank 35, and the other pipe line 41b of the forked pipe line portion 41 is connected, on one end side, to a rear right portion of the fuel tank 35.

A purge control valve (PCV; hereinafter abbreviated as "purge valve") 44, which serves as a control valve for controlling the flowing state of fuel vapor in the guide pipe 38, is provided at an intermediate portion of the discharging-side guide pipe 40. The canister 37 and the purge valve 44 are integrally attached to a support member 45, and this support member 45 is supported by the lateral frame body 20B serving as a vehicle body fixing portion.

As shown in FIG. 1, the lateral frame body 20B, which has a round pipe-like shape extending in the lateral direction, is provided at a portion between the operation unit 3 and the carrier 4, above the fuel tank 35. The lateral frame body 20B constitutes a part of the vehicle body frame 20, and has high support strength.

The canister 37 is arranged in a state of being located between a portion above the rear side of the fuel tank 35 and the lateral frame body 20B. The outer shape of the canister 37 is substantially cylindrical. The canister 37 is supported, while assuming an orientation with the axial direction thereof substantially parallel to the lateral direction, by the support member 45 made of a plate body that substantially has an L shape when seen in a side view.

Figure 7:
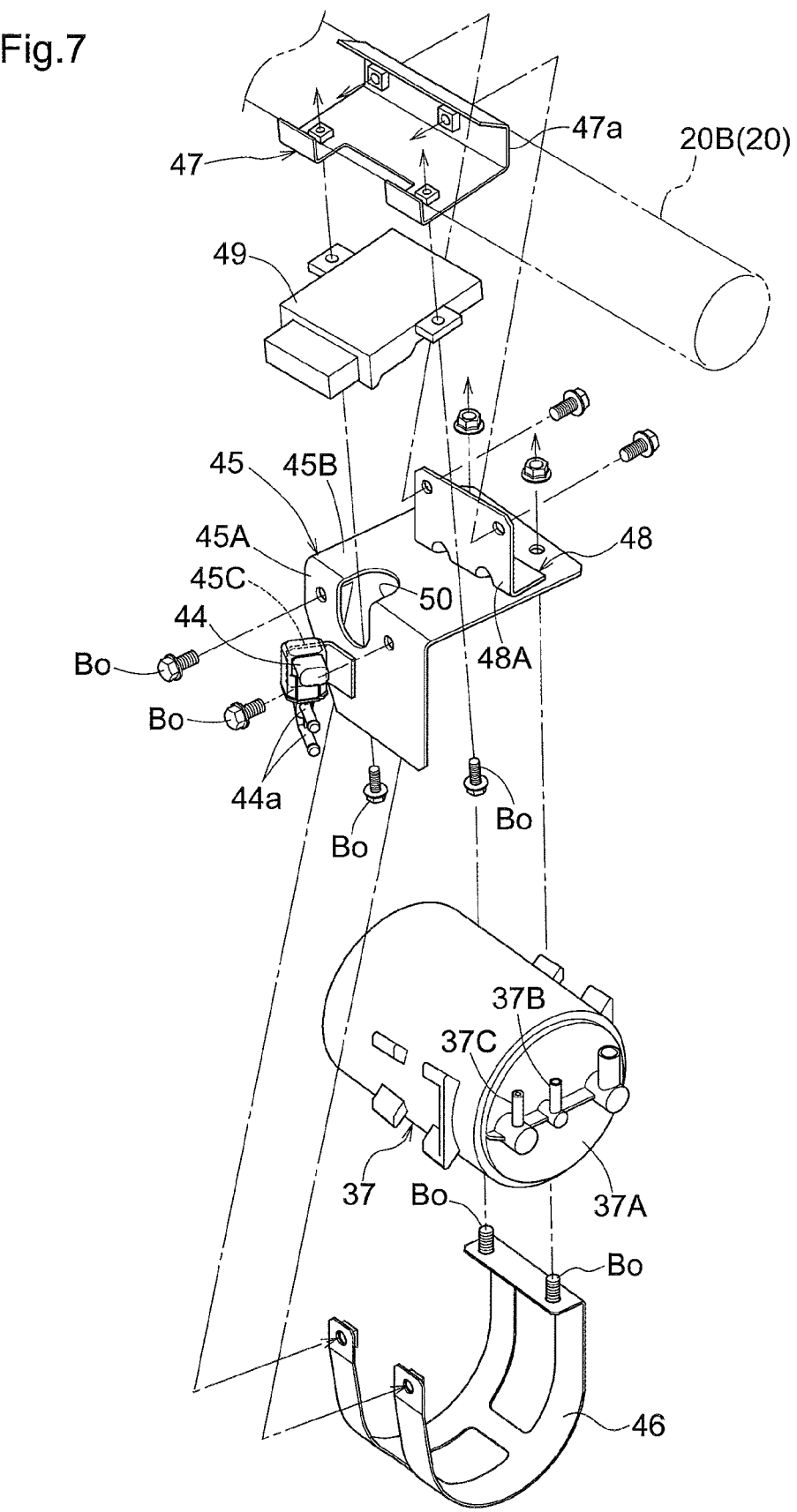
FIG. 7 is an exploded perspective view illustrating a canister support structure.

As shown in FIG. 7, the canister 37 is supported in a state of abutting against the lower side of the support member 45, and in a state of being held from below by a holding piece 46 that substantially has a U shape when seen in a side view. Front and rear end portions of the holding piece 46 are fixed to a vertical face portion 45A and a horizontal face portion 45B of the support member 45 by means of bolt connection. Bolts Bo arranged parallel to the vertical direction are used for connecting and fixing to the horizontal face portion 45B, and bolts Bo arranged parallel to the front-rear direction are used for connecting and fixing to the vertical face portion 45A. The fastening directions are thus made different so that the holding piece 46 is less twisted. The bolts Bo that are arranged parallel to the vertical direction and fasten the horizontal face portion 45B of the support member 45 to one end portion of the holding piece 46 are welded and fixed to the horizontal face portion 45B from below.

As shown in FIG. 7, a fixing-side bracket 47, which is made of a plate body that substantially has a U shape when seen in a side view, is integrally connected to an outer circumferential face of the lateral frame body 20B by means of welding or the like. A connection bracket 48, which is made of a plate body that substantially has an L shape, is integrally connected to the upper face side of the horizontal face portion 45B of the support member 45, by means of welding or the like. A vertical face portion 48A that extends upward of the connection bracket 48 and a vertical face portion 47a of the fixing-side bracket 47 are fixed to each other by means of bolt connection.

A control device 49 is fixed to the lower side of the fixing-side bracket 47 by means of bolt connection. Although not described in detail, the control device 49 includes a microcomputer and so on, the periphery thereof being covered by a waterproof casing. The control device 49 is connected to a lower face of the fixing-side bracket 47 in a state of abutting against the fixing-side bracket 47 from below, by a pair of left and right bolts Bo. A cutout 50 for attaching a bolt is formed in the support member 45, below a portion at which the left one of the pair of bolts Bo is connected. The bolt Bo can be attached from below through this cutout 50. Since the support member 45 is not located in a space below a portion to which the right bolt Bo is to be attached, and this space is open, the bolt Bo can be attached from below.

Although not described in detail, for example, the control device 49 controls the operational state of the fuel injection device (injector) based on the operational state of the accelerator pedal 7 or the like, and controls the operational state of the purge valve 44 in accordance with the running status of the engine 14.

A valve support portion 45C that extends outward is integrally connected to the rear side of the vertical face portion 45A of the support member 45. The purge valve 44 is attached to the valve support portion 45C in a state of being connected and fixed thereto with a bolt Bo. Accordingly, the canister 37 and the purge valve 44 are integrally attached to the support member 45.

As shown in FIGS. 8 and 9, a fuel introducing portion 37B to which the merging-side pipe line portion 43 of the introducing-side guide pipe 39 is connected, and a fuel discharge portion 37C to which the discharging-side guide pipe 40 is connected, are provided in a substantially circular left side face 37A of the canister 37. The fuel introducing portion 37B and the fuel discharge portion 37C each have a connection opening that is formed to open upward. The discharging-side guide pipe 40 includes an upstream-side pipe line portion 51 that connects the fuel discharge portion 37C to the purge valve 44, and a downstream-side pipe line portion 52 that connects the purge valve 44 to the suction path 26.

The fuel discharge portion 37C and the purge valve 44 provided on the canister 37 are located at positions close to each other, and the upstream-side pipe line portion 51 that connects the fuel discharge portion 37C to the purge valve 44 is a short pipe. To smoothly connect such a short upstream-side pipe line portion 51 without bending the upstream-side pipe line portion 51 as much as possible, the valve support portion 45C is provided in an obliquely inclined orientation in which the valve support portion 45C extends toward the right rear side when seen in a plan view, so that pipe connection openings 44a of the purge valve 44 face the fuel discharge portion 37C side, as also shown in FIG. 7.

As mentioned above, the canister 37 and the purge valve 44 are integrally attached to the support member 45, and the support member 45 is supported by the lateral frame body 20B. As a result, when the canister 37 and the peripheral devices are fitted to each other, for example, as shown in FIGS. 8 and 9, the canister 37, the purge valve 44, and the support member 45, as well as the merging-side pipe line portion 43 and the discharging-side guide pipe 40 can be integrally fitted, in advance, to each other to form a unit assembly in an all-inclusive state. The unit assembly can be fitted to the vehicle body by connecting the support member 45 to the fixing-side bracket 47 with bolts. This configuration improves the efficiency of the fitting operation Other Embodiments (1) The above embodiment employs a configuration in which fuel vapor is supplied to a portion of the suction path 26 on the downstream side in the suctioned air flowing direction relative to the portion at which the throttle valve 30 is installed. However, fuel vapor may be supplied to a portion on the upstream side in the suctioned air flowing direction relative to the portion at which the throttle valve 30 is installed.

(2) The above embodiment employs a configuration in which the introducing-side guide pipe 39 includes the forked pipe line portion 41 and the merging-side pipe line portion 43. However, in place of this configuration, a configuration may be employed in which the introducing-side guide pipe 39 includes one path for introducing fuel vapor from one portion of the fuel tank 35.

(3) In the above embodiment, a gasoline engine 14 is used as an engine. However, a diesel engine may alternatively be used.

(4) The above embodiment employs a configuration in which the traveling vehicle body includes the front wheels 1 and the rear wheels 2. However, the traveling vehicle body may alternatively include a crawler travelling apparatus as a travelling apparatus.

INDUSTRIAL APPLICABILITY

The present invention is applicable not only to the above-described multipurpose vehicle, but also to various work vehicles such as a tractor and a combine harvester.

What is claimed is:

1. A work vehicle comprising:
a fuel tank;
an engine to which fuel is supplied from the fuel tank through a suction path;
a canister for absorbing fuel vapor from the fuel tank;
a guide pipe for supplying fuel vapor to the suction path; and
a control valve for controlling a flowing state of fuel vapor in the guide pipe,
wherein the canister and the control valve are directly supported by a support member, and the support member is supported by a vehicle body fixing portion.

2. The work vehicle according to claim 1,
wherein the guide pipe supplies fuel vapor to a portion of the suction path on a downstream side in a suctioned air flowing direction relative to a portion at which a throttle valve is installed.

3. A work vehicle comprising:
a fuel tank;
an engine to which fuel is supplied from the fuel tank through a suction path;
a canister for absorbing fuel vapor from the fuel tank;
a guide pipe for supplying fuel vapor to the suction path; and
a control valve for controlling a flowing state of fuel vapor in the guide pipe,
wherein the canister and the control valve are integrally attached to a support member and the support member is supported by a vehicle body fixing portion,
the guide pipe is constituted by an introducing-side guide pipe that connects the fuel tank to the canister, and a discharging-side guide pipe that connects the canister to the suction path,
the introducing-side guide pipe is provided with a forked pipe line portion with two pipe lines that are connected, on one end side, to respective portions at different positions in a vehicle front-rear direction and in a vehicle left-right direction on an upper face of the fuel tank, and merge with and are connected to each other on the other side, and a merging-side pipe line portion that connects a merging portion of the forked pipe line portion to the canister,
fuel vapor is supplied to the canister through the forked pipe line portion and the merging-side pipe line portion, and
the merging-side pipe line portion can be connected to and separated from the merging portion.

* * * * *